United States Patent

Heimrath

(10) Patent No.: US 10,295,360 B2
(45) Date of Patent: May 21, 2019

(54) ASSISTANCE WHEN DRIVING A VEHICLE

(71) Applicant: Bayerische Motoren Werke Aktiengesellschaft, Munich (DE)

(72) Inventor: Michael Heimrath, Fuerstenfeldbruck (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 11 days.

(21) Appl. No.: 15/594,837

(22) Filed: May 15, 2017

(65) Prior Publication Data

US 2017/0248441 A1 Aug. 31, 2017

Related U.S. Application Data

(63) Continuation of application No. PCT/EP2015/077459, filed on Nov. 24, 2015.

(30) Foreign Application Priority Data

Dec. 15, 2014 (DE) .......................... 10 2014 225 804

(51) Int. Cl.
  *G01C 21/36* (2006.01)
  *B60W 50/00* (2006.01)
(52) U.S. Cl.
  CPC ..... *G01C 21/3691* (2013.01); *B60W 50/0097* (2013.01); *B60W 50/0098* (2013.01);
  (Continued)
(58) Field of Classification Search
  CPC ................ G01C 21/00; G01C 21/3691; G01C 21/3667; B60W 50/00; B60W 50/0098
  See application file for complete search history.

(56) References Cited

U.S. PATENT DOCUMENTS 7,433,772 B2 * 10/2008 Isaji .......................... B60T 7/22
  340/435
8,352,112 B2 * 1/2013 Mudalige ................. G08G 1/22
  340/435

(Continued)

FOREIGN PATENT DOCUMENTS

DE 10 2009 039 774 A1 3/2011
DE 10 2011 005 844 A1 9/2012

(Continued)

OTHER PUBLICATIONS

International Search Report (PCT/ISA/210) issued in PCT Application No. PCT/EP2015/077459 dated Feb. 24, 2016 with English translation (five pages).

(Continued)

*Primary Examiner* — Yonel Beaulieu
(74) *Attorney, Agent, or Firm* — Crowell & Moring LLP

(57) ABSTRACT

In order to support the driving of an ego-vehicle, the following steps are carried out: gathering information from the environment of the ego-vehicle; processing the gathered information, in such a way that it is detected whether a neighboring vehicle is in the environment of the ego-vehicle, and if a neighboring vehicle is detected, additionally gathering and/or processing information relating to the neighboring vehicle in order to assign at least one typical attribute to the neighboring vehicle; and, according to the at least one typical attribute of the neighboring vehicle, providing control information for driving the ego-vehicle.

13 Claims, 2 Drawing Sheets

(52) U.S. Cl.
CPC ..... *G01C 21/3647* (2013.01); *G01C 21/3667* (2013.01); *B60W 2050/0075* (2013.01); *B60W 2550/40* (2013.01); *B60W 2550/408* (2013.01)

(56) References Cited

U.S. PATENT DOCUMENTS

| | | | | |
|---|---|---|---|---|
| 9,645,579 | B2* | 5/2017 | Switkes | G08G 1/22 |
| 9,940,834 | B1* | 4/2018 | Konrardy | G08G 1/096725 |
| 2007/0164896 | A1* | 7/2007 | Suzuki | G01S 7/006 342/70 |
| 2010/0256835 | A1* | 10/2010 | Mudalige | G08G 1/163 701/2 |
| 2010/0256836 | A1* | 10/2010 | Mudalige | G08G 1/163 701/2 |
| 2010/0256852 | A1* | 10/2010 | Mudalige | G08G 1/163 701/24 |
| 2013/0338914 | A1 | 12/2013 | Weiss | |
| 2014/0176350 | A1 | 6/2014 | Niehsen et al. | |
| 2015/0194055 | A1 | 7/2015 | Maass | |
| 2016/0054735 | A1* | 2/2016 | Switkes | G08G 1/22 701/23 |

FOREIGN PATENT DOCUMENTS

| | | |
|---|---|---|
| DE | 10 2012 210 145 A1 | 12/2012 |
| DE | 10 2012 214 979 A1 | 2/2014 |
| DE | 10 2012 022 563 A1 | 5/2014 |
| DE | 10 2012 023 630 A1 | 6/2014 |
| EP | 2 320 384 A1 | 5/2011 |

OTHER PUBLICATIONS

German-language Written Opinion (PCT/ISA/237) issued in PCT Application No. PCT/EP2015/077459 dated Feb. 24, 2016 (seven pages).

German Search Report issued in counterpart German Application No. 10 2014 225 804.9 dated Aug. 21, 2015 with partial English translation (12 pages).

\* cited by examiner

ASSISTANCE WHEN DRIVING A VEHICLE

CROSS REFERENCE TO RELATED APPLICATIONS

This application is a continuation of PCT International Application No. PCT/EP2015/077459, filed Nov. 24, 2015, which claims priority under 35 U.S.C. § 119 from German Patent Application No. 10 2014 225 804.9, filed Dec. 15, 2014, the entire disclosures of which are herein expressly incorporated by reference.

BACKGROUND AND SUMMARY OF THE INVENTION

The invention relates to a method and a device for providing assistance when driving a vehicle and to a correspondingly equipped vehicle and to a corresponding computer program product.

When driving a vehicle, it is of essential importance to observe the environment. So-called driver assistance systems, which use sensors to detect the space around the vehicle and issue corresponding messages to a vehicle driver and/or intervene fully or partially in the control of the vehicle have been developed for this purpose. For example, the distance of the vehicle from a vehicle driving in front can be ascertained by use of a radar system and, if it falls below a minimum distance prescribed in a run-up alarm system, a warning is issued to the vehicle driver and/or automatic braking is initiated. The document DE 10 2012 210 145 A1 describes a so-called Automatic Cruise Control (ACC) system, in which the distance from an object, in particular from a vehicle driving in front, is measured and automatically controlled by means of an environment sensor, such as for example radar or lidar. It also describes specifically selecting a corresponding object and tracking the object along a driving path by use of automatic control of the lateral guidance and longitudinal guidance of the vehicle.

DE 10 2011 005 844 A1 discloses a method and a control system for the fully automatic driving of a vehicle with regard to its longitudinal guidance and lateral guidance, which are respectively controlled by a decision tree. In this case, a lateral movement of the vehicle is processed by a first decision tree, which comprises the states of staying in lane, changing lane to the left and changing lane to the right. Furthermore, a longitudinal movement of the vehicle is processed by a second decision tree, which comprises the states of controlling the speed to a setpoint speed and controlling the distance to a setpoint distance or safety distance. The first decision tree and the second decision tree are activated by an event generator, depending on an environmental condition of the vehicle that is determined by use of at least one sensor. Depending on at least one state of the first decision tree and/or of the second decision tree, at least one actuator of the vehicle is activated. DE 10 2011 083 677 A1 describes a method and a system with which the likely driving path or trajectory of a vehicle (a so-called ego vehicle) is predicted on the basis of various data and a traffic simulation, including the use of data of other vehicles.

US 2013/0338914 A1 likewise describes a method and a system with which, for determining the risk of a driving situation and, in particular, for the fully or partially automatic control of a vehicle (ego vehicle), data from the environment of the ego vehicle are detected and processed, for example in relation to the geographical position of the vehicle, in relation to the road conditions, in relation to the weather conditions or in relation to a current speed limitation. Data in relation to the ego vehicle, such as for example its model, age, service history, known defects, tire age or tire tread, may in this case also be detected and processed. Furthermore, data in relation to a driver of the ego vehicle may be detected and processed, for example data in relation to the driving ability of the driver. Furthermore, corresponding data in relation to vehicles and their vehicle drivers that are in the environment of the ego vehicle may be detected and processed. For determining the risk presented by such vehicles and vehicle drivers, it may be envisaged in particular to retrieve and use risk-determining data from a vehicle database or person database, for example also data in relation to the age, sex or state of health of the respective vehicle drivers. Data in relation to their consumption of alcohol, tobacco or medicaments or in relation to earlier anomalies in their driving behavior, in particular punishable by fines, such as for example as a result of speeding, accidents, skipping red lights or inebriation when driving, may in this case also be retrieved and used. The respective data and assessments may in this case be provided or processed in a respectively classified way.

EP 2 320 384 A1 describes a method for vehicle license plate recognition, in which vehicles are recorded by way of an optoelectronic camera, text data in relation to their respective license plate are formed from the images by Optical Character Recognition (OCR) and then, by means of a database, the assignment to vehicle license plate data stored there is performed. On the basis of such systems, it is possible for example to detect at motorway toll stations vehicles for which a toll has already been paid in advance, and accordingly a barrier at the toll station can be automatically opened for the vehicle to pass through.

The contents of the aforementioned publications are hereby incorporated by reference herein.

The object of the invention is to assist the driving of an ego vehicle to the extent that hazards in the environment of the ego vehicle are detected as well as possible.

This and other objects are achieved according to the invention by a method for assisting the driving of an ego vehicle, wherein:
information from the environment of the ego vehicle is gathered,
the information gathered is processed in such a way that it is detected whether there is a neighboring vehicle in the environment of the ego vehicle and, if a neighboring vehicle is detected, information in relation to the neighboring vehicle is also gathered and/or processed in order to assign at least one typical attribute to the neighboring vehicle, and
in dependence on the at least one typical attribute of the neighboring vehicle, control information for driving the ego vehicle is provided.

The invention is based on the realization that it is possible for the vehicle driver of an ego vehicle to draw conclusions from the nature of a vehicle in his/her environment, in particular driving in front of him/her, as to how the vehicle will behave in road traffic and, in particular, what hazards will arise from the vehicle and what the driving style of the driver of the vehicle is likely to be.

With the invention it has been realized in particular that, on the basis of data that are gathered in relation to a vehicle located in the environment of the ego vehicle, future driving situations can be calculated or simulated more precisely in advance, and in particular possible hazardous situations can be detected at an early time or already assigned to a current driving situation. This is of advantage in particular for vehicles that have a high degree of automation, and in particular for those that are longitudinally and/or laterally guided fully automatically by way of corresponding control systems. Such systems may be provided in particular as components in highly automated driving (HAD) systems, which in turn have further system components such as radio-based communication systems for so-called car-to-car communication between vehicles and/or for communication with vehicle-independent computers, so-called backend servers.

With the invention, the driving of an ego vehicle can be assisted in particular to the extent that hazards arising from vehicles in the environment of the ego vehicle can be detected well. With the invention it is also advantageously possible to create for the vehicle driver of the ego vehicle a function assisting him/her, for example in the form of a graphic display, with which he/she can match up his/her individual appraisal of the traffic situation, and in particular with respect to the likely driving style of vehicles in his/her environment, with the information gathered by sensors and processed by data technology, and take this into consideration for how he/she drives the vehicle. The invention may also be used advantageously for highly automated driving vehicles.

With the invention it is possible to draw conclusions about the likely behavior of other road users in the environment of the ego vehicle. As a result, better planning or previewing can be advantageously performed for driving the ego vehicle. This is very advantageous in particular in the case of the highly automated controlling of vehicles. It also allows safety to be increased, both in the case of manually controlled vehicles and in the case of fully or partially automatically controlled vehicles, both for the ego vehicle and its occupants and for other road users. The invention can also be used whenever the vehicle driving in front is controlled in a fully or partially automated manner.

The environment of the vehicle is a prescribed area that lies around the vehicle. It does not necessarily have to be a contiguous area and it does not necessarily have to comprise all directions around the vehicle. In particular, a contiguous, two-dimensional or three-dimensional spatial area may be regarded as the environment of the vehicle. It may lie around the vehicle within the maximum range of one or more sensor systems that generate data for carrying out one or more, in particular all, of the steps according to the invention. The surrounding area comprising the environment may be the spatial area for which such data are evaluated and/or used. The corresponding sensor system may for example comprise electronic, optical and/or radio sensors and/or components, such as for example a CCD camera, an infrared camera, a radar system, an ultrasound sensor, a mobile radio system, a Wireless Local Area Network (WLAN) system, etc.

In particular in accordance with information that has been gathered in relation to the vehicle owner and/or in relation to the vehicle driver presumed to be driving the vehicle, for example at least one of the following attributes may be assigned to a vehicle as a typical attribute:

driving safety, in particular on the basis of information in relation to the vehicle owner and/or presumed vehicle driver,
  driving style, in particular on the basis of information in relation to the vehicle owner and/or presumed vehicle driver, and
  condition of the vehicle.

The respective attributes may be additionally allocated values in stages, for example in relation to driving safety values in the three stages high/normal/low, in relation to driving style values in the stages cautious/normal/competitive, in relation to the condition of the vehicle for example values in four stages good/moderate/poor/unroadworthy or values in two stages accident-damaged/accident-free, etc. As information in relation to the neighboring vehicle, its manufacturer designation, type designation, age, model, exterior condition, official license number, etc. may also be gathered and/or processed.

By use of the control information provided for driving the ego vehicle, it is possible for example to display an item of information corresponding to the assigned attribute on a human-machine interface (HMI) of the vehicle. For example, information indicating "warning—competitive driver driving behind you" may be issued on a display device for the driver of the ego vehicle. In this case, a corresponding symbol and/or acoustic information, for example in the form of an announcement or a warning tone, may also be issued.

In an advantageous exemplary embodiment of the invention, for providing the control information, attributes from a set of prescribed attributes are assigned to the neighboring vehicle on the basis of the information gathered in the environment of the ego vehicle. A corresponding database may be provided for this purpose in the ego vehicle and/or in an external computer connected by data link to the ego vehicle, for example a backend server.

In a further, advantageous exemplary embodiment of the invention, by way of at least part of the information gathered in relation to the neighboring vehicle, data with further information in relation to the neighboring vehicle are loaded from a vehicle-external data source into the ego vehicle and provided for driving the ego vehicle, and in particular used for that purpose. As the vehicle-external source, a backend server or computer of a social network may be provided for example, or a computer provided in a stationary or mobile form in the neighboring vehicle, in particular a mobile radio or smartphone device or tablet PC provided in the neighboring vehicle.

By means of the provided control information for driving the ego vehicle, a system for the fully or partially automated driving of the ego vehicle may also be activated, in particular a system for the automatic longitudinal and/or lateral guidance of the ego vehicle and in particular for the highly automated driving of the ego vehicle.

In order to assign an attribute to the neighboring vehicle, information in relation to the vehicle driver and/or vehicle owner of the respective vehicle that is in the environment of the ego vehicle may also be gathered and/or processed. The information gathered in relation to the neighboring vehicle and/or further information may comprise in particular the official license number of the neighboring vehicle and/or data in relation to the age, sex or identity of the vehicle driver driving this vehicle, it being possible for this information to be gathered and/or provided at least partially by use of a computer that is independent of the vehicle. The data may also include historical information, for example in relation to earlier hazardous situations of the neighboring vehicle and/or vehicle driver, such as for example in relation to accidents or in relation to road traffic offences.

Also provided within the scope of the invention is a corresponding, electronic system for assisting the driving of an ego vehicle that has components with which the functions described here, and in particular method steps, can be carried out. Also provided is a vehicle that has a corresponding electronic system and also a computer program that brings about a corresponding method when it is loaded and run on a computer.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
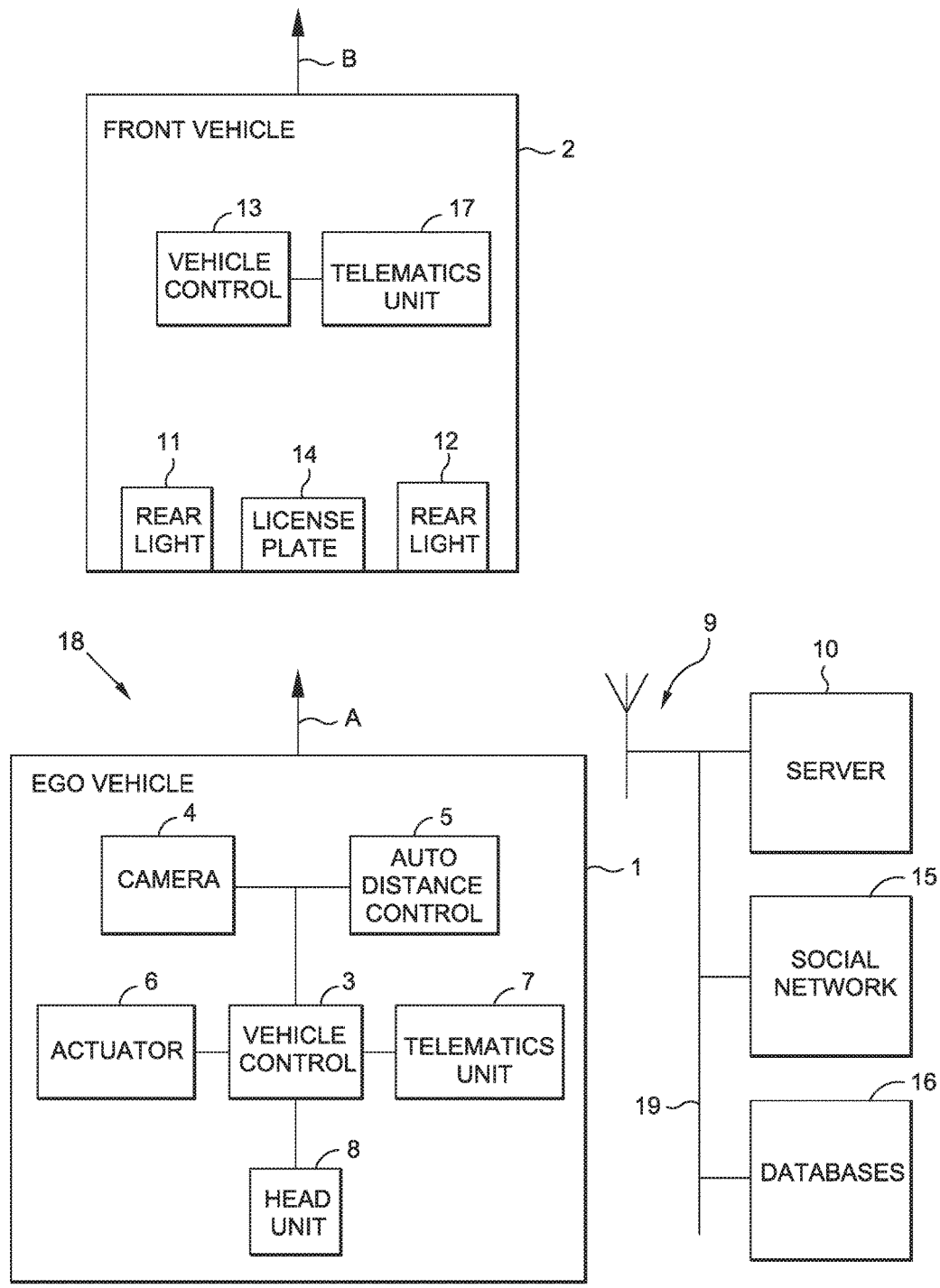
FIG. 1 is a schematic diagram of a vehicle infrastructure.

In the vehicle infrastructure that is shown in FIG. 1, a first, so-called ego vehicle (E-FZG) 1 at a speed A is following a vehicle driving in front (B-FZG) 2, which is moving at a speed B. The two vehicles 1 and 2 each have a mobile radio interface of a so-called telematics unit (TE) 7 and 17, respectively, with which in each case a mobile radio connection to a stationary mobile radio infrastructure 9 can be established. This includes for example components such as base stations of mobile radio network operators and a connection to the Internet 19. By way of this connection, a connection can in turn be established to a backend server (BE) 10, which is specifically set up for providing data for vehicles or vehicle fleets. A connection may also be established to a social network (SN) 15, such as for example Facebook, and/or to other databases (DB) 16, for example of authorities such as registration offices or a central register for traffic offenders, etc. By way of the mobile radio infrastructure 9, data can be loaded from the computers or databases 10, 15, 16 etc. connected thereto into the vehicles 1, 2.

In the vehicles 1 and 2, the telematics units 7 and 17 are in each case connected electrically and by data link to a vehicle internal control (ST) 3 and 13, respectively. It goes without saying that the vehicles 1 and 2 respectively have a multiplicity of further electrical components such as controls, sensors and actuators that are not shown in FIG. 1. Shown by way of example as further components for the ego vehicle 1, however, are a camera unit (KA) 4, a control for automatic distance control (AC or ACC) 5, an actuator (AK) 6, for example for carrying out automatic steering movements, for braking or for activating the drive, and a central display device (HU, Head Unit) 8, by way of which information assisting a vehicle driver, for example in relation to the vehicle 2 driving in front, its owner and/or current driver, can be issued. The information may in particular correspond to a typical attribute that is assigned to the vehicle 2 driving in front. A navigation system, which includes a position determining unit based for example on the GPS system and a map database, a multimedia system for issuing sound information and/or a run-up alarm system, may also be provided in the vehicle 1 or 2. In particular, the ego vehicle 1 may be set up for fully automatic, i.e. highly automated, driving, information corresponding to the assisting information referred to being used for controlling the vehicle 1.

In the driving situation shown in FIG. 1, the camera system 4 of the ego vehicle 1 captures optical images in a predetermined area of the environment of the ego vehicle 1, for example only in the front area 18, in the front and rear areas or around the ego vehicle 1 in a horizontal capturing angle of 60 degrees and/or up to a distance of 100 meters. These data are given purely by way of example and may be changed within a vehicle, in particular automatically, depending on the driving situation, depending on the speed, depending on the weather, etc.

In the front area 18, the vehicle 2 driving in front is detected by the camera system 4. From this vehicle 2, the left-hand and right-hand rear lights (RL) 11 and 12 and the official license number 14 in particular are captured and the corresponding image data processed. In this case, for example, the form and the position of the rear lights 11, 12 are captured. Furthermore, the license number 14 is extracted by using data technology and converted into a corresponding computer-readable character code by use of automatic character recognition, for example by OCR. Data derived by image processing are also generated from the image data of the rear lights, for example typical schematic structures, contours, characters and/or colors being extracted for example by way of filters, image comparison and/or OCR. The data thus obtained may be compared in the ego vehicle 1 on the basis of a database stored there with reference data, on the basis of which the rear lights 11, 12 can be assigned for example a vehicle manufacturer, a vehicle type and/or a vehicle year of construction. If no corresponding local database is available in the ego vehicle 1 and/or no assignment is possible in the ego vehicle 1, for example because the database does not contain any data in relation to vehicle types of the vehicle 2, then the image data recorded by the camera system 4 and/or the data derived therefrom may be transmitted by way of the telematics unit 7 and the mobile radio infrastructure 9 for example into the backend server 10 and further processed there in order to determine the respective vehicle data in relation to the vehicle 2.

If the data of the official license plate number 14 can be determined, it is thus possible by way of the telematics unit 7, the mobile radio infrastructure 9 and the Internet 19 to retrieve for example from a database 16 of a registration office who the owner of the vehicle 2 driving in front is, and for example to which age group he/she belongs, for example in four stages or age groups from 18 to 25 years, from 26 to 30 years, from 31 to 60 years and over 60 years. This information can then be transmitted into the ego vehicle 1, displayed there in the central display device 8 and/or used for the purpose of conditioning the control 3 for partially or fully automatic driving. For example, it may be envisaged to increase a minimum distance value slightly if the owners are inexperienced drivers (up to 25 years) and over-60-year-olds, in order not to make them feel subjectively intimidated when driving the vehicle 2. Changing lane when overtaking the vehicle 2 driving in front may also be correspondingly adapted, for example by waiting longer until changing lane or by prescribing a greater minimum value for a clear overtaking zone.

The following information may for example be gathered from or provided by a vehicle 2 located in the environment of the ego vehicle 1 and used for display or control in the ego vehicle 1:

vehicle manufacturer,
vehicle model,
vehicle year of construction,
vehicle engine version,
vehicle color,
design features of the vehicle, such as for example vehicle type (sedan, touring, coupe, convertible, transporter, truck, bus, motorcycle), form and position of the rear lights, type of tinted windows, any spoilers and add-ons, etc.
vehicle damage, in particular accident damage,
tire data, in particular age, manufacturer, type, tread and/or state of damage of one or more tires,
mileage, region where licensed (in particular according to country or locality), current driving style, for example with respect to the current traffic conditions, slow or fast, unsafe or safe, sex and appearance of the vehicle driver, it being possible in particular if the vehicle is driving behind the ego vehicle for face recognition to be carried out by use of a camera and image processing, a profile of the vehicle driver and/or owner, which includes for example place of birth, date of birth or year of birth, number of vehicles previously owned, total amount of driving, for example per year or to date, health data, data in relation to consumption of alcohol, tobacco or drugs, data in relation to road traffic offences and/or violations, data from social networks, such as for example in relation to purchasing behavior (in particular vehicle-specific, such as for example in relation to tuning kits, or else sportswear), in relation to interests, in relation to hobbies or preferences, etc.

On the basis of the assignment of the gathered data to the reference data, the vehicle 2 driving in front can then be assigned one or more typical attributes, for example with regard to:

driving safety of the presumed current driver, driving style, cautious or competitive, of the presumed current driver, and/or condition of the vehicle.

The assignment of the at least one typical attribute is performed in a corresponding assignment system. This may for example be fully or partially integrated in the camera system 4 and/or in some other control unit of the ego vehicle 1, in particular in the control 3. It may also be fully or partially provided in one or more of the vehicle-external computers 10, 15, 16. The assignment system may have components known per se of a computer, in particular a microprocessor and a computer program, which is stored in a memory and is executed on the microprocessor.

For the evaluation and/or provision of information or corresponding data and/or for the creation of a corresponding profile for a vehicle, its vehicle owner and/or its presumed vehicle driver, data from a wide variety of data sources may be used, and it is also possible to use so-called "Big Data" resources, which can gather, collect and correlate a large number of data over a number of systems.

Although only a vehicle 2 driving in front is shown in FIG. 1 in relation to the ego vehicle 1, it is clear that further vehicles located in the environment of the ego vehicle 1 can be correspondingly captured by sensors and information in relation to these vehicles, their owners and/or drivers can be gathered and/or provided and can be used in the ego vehicle 1 as assistance for driving it and/or for partially or fully automatic driving.

In particular, one or more vehicles that are located in front of the ego vehicle 1, one or more vehicles that are located behind the ego vehicle 1 and/or one or more vehicles that are located to the sides of the ego vehicle 1 may be captured and information in relation to these vehicles, their owners and/or drivers may be gathered and/or provided.

For obtaining information in relation to a vehicle located in the environment of the ego vehicle 1, further sensor-based and/or data-technical devices may be used, for example for direct wireless communication between the vehicles (so-called car-to-car communication), it being possible for corresponding data to be read out from an electronic memory of the vehicle located in the environment and transmitted by means of a radio connection (mobile radio and/or WLAN, etc.) into a memory of the ego vehicle 1.

Figure 2:
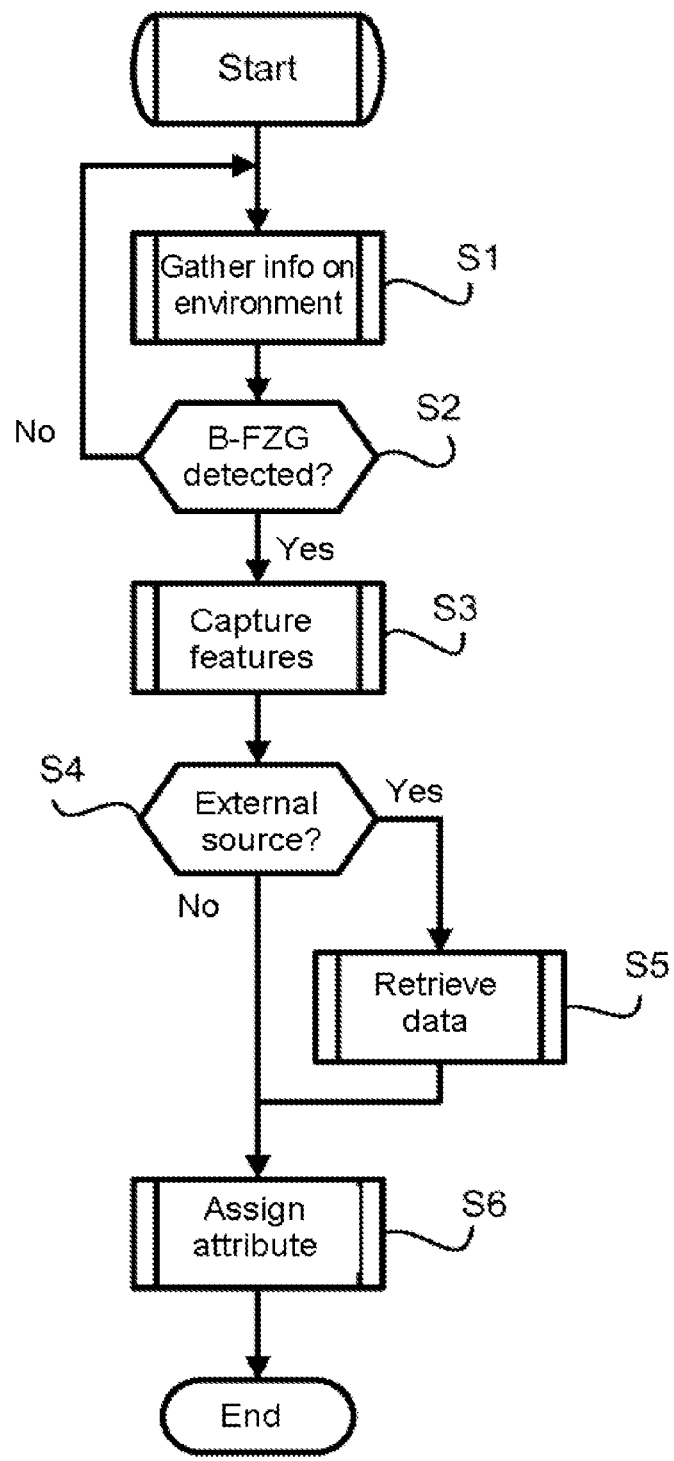
FIG. 2 is a flow diagram.

Shown in FIG. 2 is a simplified flow diagram with method steps that have at least partially already been described further above and in connection with FIG. 1. In a step S1, information or data in relation to vehicles that are located in the environment of an ego vehicle is/are gathered. The gathering may for example be performed by way of one or more optical and/or IR cameras, radar systems, ultrasound distance sensors, etc. In particular by use of an optical and/or IR camera provided in the rear of the ego vehicle and pointing to the rear, one or more images of the driver of a vehicle following the ego vehicle may also be captured.

In step S2, the captured data are processed and thereby analyzed as to whether a neighboring vehicle has been detected in the environment of the ego vehicle. If no neighboring vehicle has been detected, the procedure returns to step S1. Otherwise, in step S3 features in relation to the detected neighboring vehicle are captured, such as for example its manufacturer, model, type, engine version, etc. This may be performed on the basis of prescribed criteria and corresponding algorithms.

For specific aspects of the vehicle, this may involve investigating the appearance and/or predetermined features, known as feature points. At the same time, information of characteristics that are provided on the vehicle and captured, such as for example a manufacturer's logo or a vehicle designation, may also be used. This may involve using information in relation to a multiplicity of vehicle manufacturers and vehicle types that is available in particular in the ego vehicle in a local database. In step S4, it is checked whether a connection to an external data source, such as for example a backend server, is available for an evaluation of gathered information of the adjacent vehicle and/or for the provision of further information. If appropriate, in step S5 corresponding data are transmitted between the data source and the ego vehicle. Otherwise, the procedure goes on directly to step S6.

In step S5, firstly data are loaded from the ego vehicle into the external data source. The external data source may then optionally provide data or else process data and allocate an attribute (step S6). Prescribed data sources may be specifically selected and/or it may be prescribed which data are to be retrieved, for example that in respect of the owner of the vehicle driving in front, identified on the basis of its official license plate number, his/her year of birth and the year in which he/she obtained a driver's license is requested, and also an indication as to whether there is any entry for him/her in an official register of traffic offenders. For the identification of a vehicle driver, in particular the vehicle driver of the vehicle following the ego vehicle, a corresponding database with pictures of persons may be called up. For example, it is possible by way of a comparison of the pictures of persons stored in a social network with the image or images recorded in the ego vehicle to identify a person as a presumed vehicle driver, for example of the following vehicle, and perhaps to retrieve further information from the profile of the identified person, such as for example his/her age and interests. On this basis, a corresponding profile of prescribed data in relation to the vehicle driver can be prepared.

In step S6, in a first case situation, the vehicle driving in front is assigned on the basis of the previously determined data in relation to the vehicle driving in front, the vehicle owner and/or the presumed vehicle driver at least one typical attribute, for example with regard to a competitive or cautious driving style. This may involve using information in relation to a multiplicity of vehicle manufacturers and vehicle types that is available in particular in the ego vehicle in a local database when the allocation of the typical attribute or attributes is performed in the ego vehicle. In a second case situation, the assignment of the typical attribute or attributes may also take place in the external data source or in an external computer, this data source or this computer then having inter alia a database with corresponding information in relation to a multiplicity of vehicle manufacturers and vehicle types. In step S5, in the second situation only the feature data from step S4 are loaded into the external data source or the external computer and, in step S6, the respective data are then transmitted into the ego vehicle after the allocation of the at least one typical attribute.

On the basis of the attribute assigned in step S6, or the assigned attributes, a corresponding control may be performed in the ego vehicle, for example a display of the profile data and/or the attributes may be performed and/or, in a highly automated driving vehicle, the driving strategy and/or trajectory may be controlled or influenced in such a way that it is adapted to the vehicle detected in the environment of the ego vehicle, in particular to the driving style of its vehicle driver. On the basis of the attributes, individual system components of a vehicle may also be activated, for example an ACC or a run-up alarm system, so that they can respond more quickly and better.

The vehicle may in particular be a motor vehicle. The respective sensors and actuators may otherwise be operated in a way known per se for the fully or partially automated driving of a vehicle, in particular for highly automated driving. For this purpose, at this point reference is once again made to the publications mentioned at the beginning.

It can be detected on the basis of the official license plate number which color the captured vehicle has. With knowledge of the color, the sensitivity and/or contrast of an optical camera and/or an IR camera can then be set, in particular dynamically adapted. As a result, further details of a vehicle can be recorded even better.

The described devices and system components are controlled in particular by computer programs and may for this purpose have further elements known per se of computers and digital control devices, such as a microprocessor, volatile and nonvolatile memories, interfaces, etc. The invention may therefore also be realized fully or partially in the form of a computer program product which, when loaded and executed on a computer, fully or partially brings about a procedure according to the invention. It may for example be provided in the form of a data carrier such as a CD/DVD or else in the form of one or more files on a server, from which the computer program is downloadable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing assistance when driving an ego vehicle, the method comprising the acts of:
    gathering information from an environment of the ego vehicle;
    processing the information gathered such that it is detected whether there is a neighboring vehicle in the environment of the ego vehicle and, if a neighboring vehicle is detected, also gathering and/or processing information in relation to the neighboring vehicle in order to assign at least one typical attribute to the neighboring vehicle; and
    based on the at least one typical attribute of the neighboring vehicle, providing control information for driving the ego vehicle,
    wherein the at least one typical attribute comprises one or more of the following attributes:
        driving safety in relation to an owner or assumed driver of the neighboring vehicle,
        driving style in relation to the owner or assumed driver of the neighboring vehicle, or
        an overall condition of the neighboring vehicle.

2. A method for providing assistance when driving an ego vehicle, the method comprising the acts of:
    gathering information from an environment of the ego vehicle;
    processing the information gathered such that it is detected whether there is a neighboring vehicle in the environment of the ego vehicle and, if a neighboring vehicle is detected, also gathering and/or processing information in relation to the neighboring vehicle in order to assign at least one typical attribute to the neighboring vehicle; and
    based on the at least one typical attribute of the neighboring vehicle, providing control information for driving the ego vehicle,
    wherein, by way of at least part of the information gathered in relation to the neighboring vehicle, data with further information in relation to the neighboring vehicle are loaded from a vehicle-external data source into the ego vehicle and provided for driving the ego vehicle.

3. The method as claimed in claim 2, wherein
    the data with the further information in relation to the neighboring vehicle are processed and used for the assignment of the at least one typical attribute to the neighboring vehicle.

4. The method as claimed in claim 2, wherein
    the data with the further information in relation to the neighboring vehicle are provided from a vehicle-external computer.

5. The method as claimed in claim 4, wherein
    the vehicle-external computer is one of a backend server, a server of a social network, or an external database.

6. The method as claimed in claim 4, wherein
    the data with the further information are loaded from the vehicle-external computer into the ego vehicle by way of a radio connection and used for driving the ego vehicle.

7. The method as claimed in claim 1, wherein
    a sensor system, which comprises an optical camera, an infrared camera, a radar system, an ultrasound system, a mobile radio system and/or a Wireless Local Area Network system, is used for gathering the information from the environment.

8. The method as claimed in claim 1, wherein
    the driving of the ego vehicle is performed fully or partially automatically.

9. The method as claimed in claim 8, wherein
    the driving of the ego vehicle is performed in a highly automated manner.

10. An electronic system for assisting driving of an ego vehicle, the electronic system comprising a processor and associated memory having stored thereon program code that, when executed by the processor, carries out the acts of:
    gathering information from an environment of the ego vehicle;
    processing the information gathered such that it is detected whether there is a neighboring vehicle in the environment of the ego vehicle and, if a neighboring vehicle is detected, also gathering and/or processing information in relation to the neighboring vehicle in order to assign at least one typical attribute to the neighboring vehicle; and based on the at least one typical attribute of the neighboring vehicle, providing control information for driving the ego vehicle, wherein the at least one typical attribute comprises one or more of the following attributes:
- driving safety in relation to an owner or assumed driver of the neighboring vehicle,
- driving style in relation to the owner or assumed driver of the neighboring vehicle, or
- an overall condition of the neighboring vehicle.

11. The method as claimed in claim 2, wherein the driving of the ego vehicle is performed fully or partially automatically.

12. The method as claimed in claim 11, wherein the driving of the ego vehicle is performed in a highly automated manner.

13. The electronic system as claimed in claim 10, wherein, by way of at least part of the information gathered in relation to the neighboring vehicle, data with further information in relation to the neighboring vehicle are loaded from a vehicle-external data source into the ego vehicle and provided for driving the ego vehicle.

* * * * *